Patented Apr. 21, 1931

1,802,246

UNITED STATES PATENT OFFICE

ALPHONSE GAMS AND GUSTAVE WIDMER, OF BASEL, SWITZERLAND, ASSIGNORS TO THE FIRM SOCIETY OF CHEMICAL INDUSTRY IN BASLE, OF BASEL, SWITZERLAND

MANUFACTURE OF ARTIFICIAL MATERIALS

No Drawing. Application filed February 25, 1928, Serial No. 257,100, and in Switzerland March 1, 1927.

Our invention relates to the manufacture of combined pieces, particularly sheets or plates, of artificial materials and it is especially directed to the production of colorless glass like combined pieces of condensation products of carbamides and formaldehyde.

It is known that the resistance of a sheet of glass to shock or a blow or other cause of shattering, is improved by connecting two sheets of glass together by means of an elastic middle layer consisting of celluloid, acetyl cellulose or the like, with aid of a suitable adhesive. By this arrangement it is particularly intended to impart to the sheet an enhanced safety against splintering when fractured, since the softer intermediate layer holds on to the fractured pieces and prevents their splintering.

According to this invention, such combined sheets or plates are obtained when separate sheets or plates made of condensation products of formaldehyde and urea or derivatives or substitution products thereof, are combined homogeneously with each other.

When the object is the manufacture of particularly resistant materials for motor-car screens, flying machine screens, spectacles or the like, it is suitable to combine together several layers of different hardness, as indeed is the practice referred to in the first paragraph hereof, the middle layer being more elastic and softer in its final condition than the material constituting the outer layers, which should be as hard as possible in its final condition. These conditions being observed the final product will have the desired resistance to shattering.

The so-called unbreakable properties of the compound glass referred to in the first paragraph hereof is surpassed by the compound artificial resinous materials of this invention, just as an ordinary sheet of formaldehyde-urea-condensation-product surpasses glass in resistance to breakage. Another advantage of the material according to this invention is the ease with which it may be worked.

Homogeneous sheets and plates of special thickness can also be made by the process of the invention, of such thickness, indeed, as is not possible in the normal manufacture of the artificial resins. In this case it is not necessary to unite layers of different hardness and elasticity but completely similar sheets or plates may be combined together.

The invention is not limited to the production of sheets and plates, since other forms can be manufactured in like manner.

The component pieces may be combined either in the semisolid or solid state. When the components are in the gelatinized i. e. semisolid state the component pieces may advantageously be united by rolling and then hardened. If hardened condensation products are to be united the separate layers may be combined, with or without an adhesive, by pressure, if necessary at a raised temperature.

For obtaining a homogeneous union of the several pieces it is not generally necessary to use an adhesive. The layers can usually be laid together without any adhesive and caused to unite to an absolutely homogeneous piece without any separating surface by the further hardening operation. Only when quite finished polymerized products are used it is advantageous to apply a cement in order to ensure a more secure union of the several layers. In this case it is specially advantageous to use the material in its liquid condensation phase for cementing the layers of finished artificial resin. This is particularly of importance when an optically homogeneous material is required. Furthermore, it is possible to use such substances as cements as have the property of softening or dissolving the surface of the pieces to be cemented, for instance formaldehyde. However, other adhesives may be used for cementing the layers.

The single pieces may be colored for obtaining, for instance, light filters. Pure individual colors which are not compatible with each other in solution may be combined together to produce pure mixed colors.

Instead of transparent condensation products, such as are used for motor-car screens, flying machine screens, spectacles or the like, there may be used for special effects opaque condensation products or such to which filling materials have been added.

The following examples illustrate the invention.

Example 1

A. 5 kilos of urea are dissolved in 12.7 litres of formaldehyde of 40 per cent. strength and the solution is filtered after addition of 0.6 kilo of animal charcoal. The solution is then heated for 8 hours in an autoclave at 100° C. and then evaporated at a low temperature; it is finally cast into moulds after addition of 0.01 kilo of phosphoric acid in syrupy form and hardened by increasing the temperature.

B. The proceeding is as described under A, but together with phosphoric acid there is added 0.5 kilo of benzyl alcohol as a softening agent.

When the hardening has proceeded so far that the glassy mass can be worked, thin sheets are cut and a sheet of B is laid between two sheets of A. This combination of layers is then pressed for 1 hour at 100° C. and 50 atmospheres pressure. The plate thus obtained is further hardened in the usual manner until polymerization is complete.

Example 2

The materials made in accordance with Example 1, A and B are hardened only until they form solid, glassy jellies. They are then cut into layers and the latter are put together as described in Example 1 and united by light pressure in a rolling machine, whereafter they are hardened to form a finished product.

Example 3

The materials made as described in Example 1, A and B are cast on to a table capable of being heated, the material A being thus cast with an open surface and the material B having its surface covered with a thin sheet of metal foil or of glass. After about ½ hour, the hardening has so far progressed that the layers can be removed in the form of clear sheets, soft as rubber. Two sheets of A are applied with their sticky surfaces against the sticky surfaces of sheet B and the combination is rolled under gentle uniform pressure, the homogeneous sheet thus obtained being finally hardened.

The examples can obviously be varied to suit the purpose and the kind of the final form which the material is to take.

What we claim is:—

1. As a new material the colorless artificial compound glass consisting of several sheets of condensation products of carbamides and formaldehyde, homogeneously connected together, the inner layer or layers being of softer material than the outer layers.

2. As a new material the colorless artificial compound glass consisting of several sheets of condensation products of urea and formaldehyde, homogeneously connected together, the inner layer or layers being of softer material than the outer layers.

In witness whereof we have hereunto signed our names this 9th day of February, 1928.

ALPHONSE GAMS.
GUSTAVE WIDMER.